June 21, 1938.  C. L. BOWDEN  2,121,727
TWO-CYCLE ENGINE
Filed June 4, 1934  4 Sheets-Sheet 1

INVENTOR.
CHARLES L. BOWDEN
BY Albert C. Bree
ATTORNEY.

June 21, 1938.                C. L. BOWDEN                2,121,727
                              TWO-CYCLE ENGINE
                           Filed June 4, 1934          4 Sheets-Sheet 2

INVENTOR.
CHARLES L. BOWDEN
BY *Albert C. Bell*
ATTORNEY.

June 21, 1938. C. L. BOWDEN 2,121,727
TWO-CYCLE ENGINE
Filed June 4, 1934 4 Sheets-Sheet 4

INVENTOR.
CHARLES L. BOWDEN
BY Albert C. Bill
ATTORNEY.

Patented June 21, 1938

2,121,727

UNITED STATES PATENT OFFICE 2,121,727

TWO-CYCLE ENGINE

Charles L. Bowden, Valparaiso, Ind.

Application June 4, 1934, Serial No. 728,953

11 Claims. (Cl. 123—53)

My invention pertains to a two cycle internal combustion engine construction, by which smooth and regular firing of the charges of fuel mixture in the engine, are effected for all operating conditions of the engine, whether on full load, partial load or when running without load. By my invention I associate with each power cylinder and piston, an auxiliary cylinder and piston, the corresponding power and auxiliary cylinders being in open communication respectively at their head ends at all times, and ports being provided in the cylinders opened and closed by the respective pistons to control the intake to and exhaust from the cylinders, devices being provided to regulate the effective size of the intake ports to efficiently operate the engine for different conditions of load and for no load. Each power cylinder and its piston, together with the corresponding auxiliary cylinder and its piston, are referred to herein for convenience as an engine unit, the multi-cylinder construction consisting of a plurality of such engine units connected with a main crank shaft or with a first common power crank shaft and an auxiliary common crank shaft, as the case may be, and as described below.

By my invention provision is made for supplying at least a part of the fuel mixture of each charge, to the auxiliary cylinder of each engine unit, regardless of the load condition on the engine, for retaining at suitable firing means, at least a part of the fuel mixture so supplied to the auxiliary cylinder for each of its cycles of operation, and for firing the mixture so retained, at substantially the beginning of each power stroke. By my invention, I also provide pumping means separate from the pistons of the engine, for supplying the fuel mixture to the intake ports at desired pressures greater than atmospheric pressure, said pumping means being driven from the crank shaft of the engine, to the end that the fuel mixture may be forced into the cylinders under any pressure desired.

The devices employed to change the effective size of the intake ports, are preferably controlled in such a manner that the supply of fuel mixture to the cylinders of each engine unit, may be continued during the initial portion of each compression stroke, but that the intake ports for each engine unit shall be completely closed before the compression pressure in the cylinders of that engine unit, is quite equal to the pressure on the mixture produced by the pumping means, as will be described below, to the end that the maximum possible mixture charge may be supplied to the cylinders of each engine unit for any particular operating condition, that the mixture retained at the firing means may not be displaced therefrom during compression, and that back flow of the mixture from the cylinders into the intake manifold during compression may be prevented, particularly under light load or no load running conditions.

Where the engine is provided with a common power crank shaft and a common auxiliary crank shaft connected respectively with the power pistons and the auxiliary pistons, the crank shafts are connected by suitable gearing having a one to one ratio, and the auxiliary pistons may have any desired stroke relatively to the stroke of the power pistons. Where the engine is provided with a single common crank shaft, the power pistons and the auxiliary pistons have substantially the same stroke, and in this case, I prefer to displace the crank shaft from the axes of the power cylinders, towards the auxiliary cylinders, for by so doing I lag the operation of the auxiliary pistons somewhat behind the operation of the corresponding power pistons, with some advantage in connection with retaining the fuel mixture at the firing means during each compression stroke. The mixture pumping means employed, are preferably so constructed as to constitute a part of the intake manifold of the engine, as will be described.

While the auxiliary piston of each engine unit, may have any desired diameter and stroke that will most effectively cooperate with the power piston of said unit to meet the requirements of any particular case, I find it desirable, particularly where the engine is required to run smoothly at slow speed on no load, to make the auxiliary piston of each engine unit, of substantially smaller diameter than the diameter of the power piston of the same engine unit, for example, about one-half of the diameter of said power piston.

An important feature of my invention, which is effective in retaining the fresh fuel mixture at the firing means, even for a fuel charge too small to fill the auxiliary cylinder of any of the engine units, consists of restricting the clearance space over each auxiliary piston in which space the firing means are located, and making it substantially smaller in proportion, than the clearance space over the power piston of the same engine unit. This results in each charge of fresh fuel mixture admitted to the auxiliary cylinder containing said auxiliary piston, even when said charge is the smallest for which the engine will run at all under no load, being positively placed in contact with said firing means and retained there during the compression stroke, and the positive firing of said compressed charge at the desired point of each power stroke for which the firing mechanism may be adjusted, which firing point may, of course, be retarded, advanced or otherwise adjusted, as desired, by means well known in the art, and forming no part of the present invention. I preferably in some cases, provide a pocket communicating with and forming a part of said restricted clearance space and containing said firing means, to aid in retaining the compressed fuel charge in contact with the firing means, although the restricted clearance space may be employed without said pocket, if desired. Said restricted clearance space is preferably as small as practical considerations will permit, without interfering with the efficient and effective operation of said firing means.

By my invention I also provide an improved deflector construction for pistons employed in two cycle engines, to more thoroughly scavenge the cylinders than has heretofore been possible, and I also provide an improved piston construction effecting more efficient operation and lubrication than has heretofore been possible.

My present invention is an improvement on the invention forming the subject matter of United States Letters Patent No. 1,341,838 which were granted to me June 1, 1920.

The above and other objects of my invention will best appear by reference to the accompanying drawings illustrating preferred embodiments thereof, in which.

Similar numerals refer to similar parts throughout the several views.

Figures 1, 2, 3, 4:
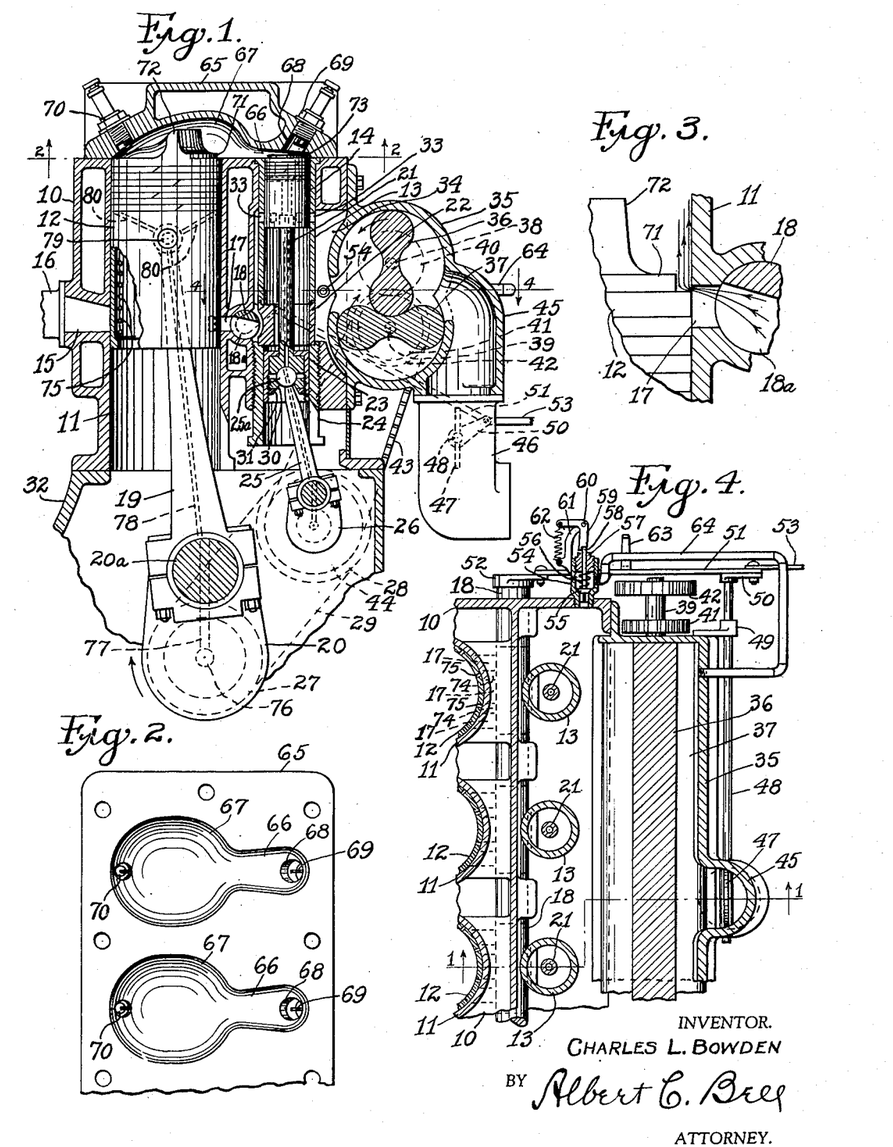
Fig. 1 shows in vertical, sectional view taken centrally through one of the engine units, a construction of my engine using two common crank shafts, this view being taken along the line 1—1 in Fig. 4.
Fig. 2 is a horizontal, sectional view of a part of the construction shown in Fig. 1, taken along the line 2—2.
Fig. 3 shows in a view similar to Fig. 1 to an enlarged scale, the power piston at the moment of opening the intake port in its cylinder.
Fig. 4 is a horizontal, sectional view of the construction illustrated in Fig. 1, taken along the line 4—4, in Fig. 1.

As shown in Figs. 1 and 4, my engine construction consists of a cylinder block 10 provided with a plurality of power cylinders 11 containing power pistons 12. The block 10 is also provided with a plurality of auxiliary cylinders 13 containing auxiliary pistons 14, each auxiliary cylinder being preferably in alignment laterally, with the power cylinder with which it co-operates. Each of the auxiliary cylinders 13 preferably consists of a metal sleeve forced tightly into a corresponding bore in the block 10, there being a clearance space entirely around said sleeve below its upper portion at which it is tightly engaged by the block. Each power cylinder 11 is provided with an exhaust port 15 communicating with an exhaust manifold 16, and is also provided with an intake port 17 controlled by a cylindrical port throttle valve 18 comprising a cylindrical rod having a cut away portion 18a in line with the port 17 of each power cylinder, the port throttle valve 18 being continuous throughout the length of the block 10 to simultaneously control the intake ports 17 of all of the power cylinders.

Each of the pistons 12 is connected by a connecting rod 19 with a common crank shaft 20 having a direction or rotation illustrated by the arrow, said crank shaft being preferably displaced towards the auxiliary cylinders 13 from the axes of the cylinders 11, which displacement, in view of the direction of rotation indicated for the crank shaft 20, I designate for convenience, as a displacement in the direction of rotation of the crank shaft.

As illustrated in Fig. 1, the stroke of each of the auxiliary pistons 14 is short relatively to the stroke of each of the power pistons 12, and to control the movement of the auxiliary pistons, I employ the following construction: a piston rod 21 extends downwardly from each auxiliary piston 14, through a ring member 22, and is connected at its lower end with a cross head 23 mounted for vertical sliding movement in a vertical and externally threaded sleeve 24 held in a correspondingly threaded opening in the block 10 co-axially with the corresponding auxiliary cylinder 13, the upper end of the sleeve 24 being recessed to form a seat for the lower end of the ring member 22, and the upper end of the ring member 22 having a shouldered engagement with the lower end of the auxiliary cylinder 13, to afford support for the lower end of said auxiliary cylinder. The cross head 23 is connected by a connecting rod 25 with a crank shaft 26 which is common to all of the auxiliary pistons and is connected for rotation with the crank shaft 20 by wheels 27 and 28 respectively secured to the crank shafts 20 and 26, said wheels being connected together by a chain 29 and having a one to one ratio. Each connecting rod 25 is held in its cross head 23, by providing the upper end of the connecting rod with a ball 25a held in place by a ring 30 screwed into the lower end of the cross head 23, which ring is held in place by a threaded locking ring 31. In this manner, the stroke of the auxiliary pistons may be as short as desired, the common crank shaft 26 may be mounted in the crank case 32, and lateral thrusts resulting from the action of the connecting rods 25 may be taken care of.

Each of the auxiliary cylinders 13 is provided with intake ports 33 which are uncovered when the corresponding auxiliary piston 14 is in its lowermost position, and since a compartment 34 provided in the block 10 entirely surrounds the cylinder 13, the ports 33 opening into said compartment, may extend entirely around the auxiliary cylinder, these ports being separated by bridges to insure smooth movement of the rings of the piston 14 over the intake ports. The compartment 34 is also in open communication with the port throttle valve 18, and constitutes the intake manifold of the engine, which manifold is closed by the housing 35 of the pump employed to deliver fuel mixture to the engine. The pump illustrated, is of the blower type having two lobed members 36 and 37 mounted for rotation on parallel shafts 38 and 39 respectively, said members being constructed so that the lobes and depressions of the members are closely adjacent and nearly in engagement with each other at all times as the members are rotated in the directions indicated by the arrows, which rotation is accomplished by securing to the shafts 38 and 39, intermeshing gears 40 and 41 respectively which are of equal diameter, the shaft 39 being also provided with a gear or wheel 42 connected by a belt or chain 43 with a gear or wheel 44 carried by the crank shaft 26. The wheel 44 is preferably larger than the wheel 42 so that the lobed members 36 and 37 will be driven at a higher speed than the speed of rotation of the crank shafts. The pumping mechanism 35 is provided with an intake passageway 45 connected with carbureting means 46 provided with a throttle valve 47 for controlling the supply of fuel mixture to the pumping means and in turn to the engine, said throttle valve being supported for turning movement by a shaft 48.

As shown in Fig. 4, the shaft 48 is extended somewhat beyond the end of the cylinder block 10, where it is supported by a bracket 49, and has secured to its end, a crank 50 connected by a link 51 with a crank 52 rigidly secured to the end of the port throttle valve 18 extended beyond the block 10. A rod 53 is also connected with the crank 50 and the adjacent end of the link 51, to extend to a convenient location for operation of the throttle valve 47 by the operator of the engine. In this manner, opening and closing the throttle valve 47, also opens and closes the intake ports 17 of the power cylinders 11, the adjustment of the parts being preferably such that just before the throttle valve 47 is in its wholly closed position, the port throttle valve 18 completely closes the intake ports 17, as a result of which for conditions of running under very light load or no load, all of the fuel mixture supplied to the engine is caused to flow through the intake ports 33 of the auxiliary cylinders 13.

To provide against excessive fluid pressures in the intake manifold when the throttle valve 47 is in its nearly closed condition, I preferably employ a pressure relief valve 54 communicating with the intake manifold and having a valve member 55 held against its seat by a spring 56, the tension of which spring may be adjusted by a screw plug 57 threaded into the relief valve 54. The valve rod 58 connected with the valve member 55, extends through the plug 57 and excepting for conditions where the throttle valve 47 is nearly closed, said valve rod is restrained from outward movement by a latch 59 pivotally supported at 60 on a bracket 61 extending from the relief valve, said latch being held in its position engaging the valve rod 58, by a light spring 62 unless moved from such engagement. The link 51 carries a bent arm 63 which moves from and towards the latch 59 as the throttle valve 47 is opened and closed, and when the throttle valve is nearly closed, the arm 63 engages the latch 59 to move it from engagement with the valve rod 58, for which condition the valve member 55 may respond to pressure in the intake manifold and be moved thereby from its seat when said pressure exceeds a predetermined amount determined by the setting of the spring 56. The casing of the relief valve is connected by a relief pipe 64 with that part of the interior of the casing of the pumping mechanism 35 that is in communication with its supply passageway 45. In this manner, for conditions where the engine is running under light load or no load, the fluid pressure in the intake manifold may be limited to a desired amount.

As shown in Figs. 1 and 2, the cylinder head 65 employed to close the upper ends of the power and auxiliary cylinders, is provided with a passageway 66 extending from above the auxiliary piston 14 of each engine unit, to a clearance space 67 provided above the upper end of the power cylinder 11 of said engine unit, to effect free communication between the head ends of the auxiliary cylinder and the power cylinder of each engine unit at all times. The clearance space 67 clears the deflector construction on the upper end of the power piston below described, and also has the requisite volume to determine the compression ratio of the engine. The auxiliary piston 14 in its uppermost or head end position, is as nearly in contact with the upper wall of the passageway 66, as practical considerations of construction and operation will permit, there being thus a much restricted compression clearance space above the auxiliary piston. The firing means employed, for example a spark plug 69, is mounted in the head 65 above the auxiliary piston 14 of each engine unit, in the restricted compression clearance space above said auxiliary piston, which, as illustrated, is done by providing in the head 65, a pocket 68 opening into and forming a part of said clearance space and containing said firing means. The pocket 68 protects the firing means and permits reducing the compression space above the auxiliary piston to a minimum. It will be understood that I do not limit myself to this particular construction, the only requisites being that the firing means shall be in communication with the restricted compression space above the auxiliary piston, that said clearance space shall be restricted as much as practical limitations of construction and operation will permit, and that said firing means shall be housed in a manner to not unduly increase said clearance space and that will not interfere with its effective and efficient operation in firing the fuel mixture compressed in said retricted clearance space. As a result, each charge of fresh fuel mixture admitted to the auxiliary cylinder of any of the engine units, regardless of how small the charge may be as long as it is sufficient to run the engine at all under no load, is moved by the next compression stroke of the piston in said auxiliary cylinder, into the said restricted compression space and into contact with the firing means associated therewith, ready for efficient and effective firing thereby. For minimum fuel charges, the pressure in the intake manifold is so small as to only project into the auxiliary cylinders such minimum charges; each such charge may be sufficient to fill but part of the auxiliary cylinder into which it is admitted, in which event the fresh charge flows gently into said auxiliary cylinder and rests on the piston in said auxiliary cylinder beneath the spent gases from a previous firing filling the upper portion of said auxiliary cylinder; yet on the following compression stroke, due to the relatively greater compression space 67 above the corresponding power piston 12, the said spent gases are pushed through the passageway 66 and into the clearance space 67, until at the end of said compression stroke, the small fresh charge on the auxiliary piston, is forced into said restricted clearance space above said auxiliary piston, and into contact with the firing means 69, in condition for effective firing. In this way, smooth, even and regular firing, without missing, is assured for any and all running conditions of the engine, for which the fuel charges are large enough to be fired under any circumstances and in any type of engine construction.

It will be observed that the power piston and the auxiliary piston of each engine unit move upwardly at the same time, and that each contributes its part to the compression of each fresh fuel mixture charge supplied to that engine unit, as a result of which, for reduced fuel charges, for example, where the engine is running without load, the dividing surface between the remaining spent gases and the fresh mixture supplied to the auxiliary cylinder, moves progressively through the passageway 66 from the auxiliary cylinder to the main cylinder during a compression stroke, which prevents the forcing of the spent gases into the restricted clearance space above the auxiliary cylinder, during the compression stroke. I preferably mount a second firing means, for example a spark plug 70 in the head 65 and in communication with the clearance space 67, at a point remote from the passageway 66, to insure effective and efficient firing of the fuel charges when the engine is operating under a substantial load. The firing means employed may be of any kind known to the art, and they may be operated and timed, as desired, in any well known manner, not shown herein, since my present invention does not extend to or include any particular construction of such devices.

As shown in Figs. 1 and 3, the power piston 12 of each engine unit, is preferably provided with two deflectors, which are in line with the intake port 17, one of said deflectors comprising a cylindrical surface 71 having a height substantially less than the height of the intake port 17 and separated from the cylinder wall by an amount substantially equal to the height of said cylindrical wall. The second deflector 72 is provided with a height equal to or greater than the height of the intake port 17 and a correspondingly large clearance or separation from the cylinder wall. The purpose of the deflector 71 is to act upon the incoming fuel mixture flowing through the intake port 17, at the instant said port is opened by the downward movement of the power piston 12, at which time, as illustrated in Fig. 3, the inflowing mixture strikes the cylindrical wall of the deflector 71 which is substantially parallel with the wall of the cylinder, and the cylindrical wall of the deflector directs the mixture upwardly in contact with the cylinder wall, to start the spent gases in motion that may be in contact with the cylinder wall, and drive said gases towards the exhaust port 15. Immediately after this occurs, and the piston 12 has moved to a somewhat lower position, the incoming gases engage the deflector 72, which imparts upward movement to them more centrally of the cylinder 11, the deflector 72 being curved both vertically and laterally, which tends to completely scavenge the cylinder of the spent gases of the preceding stroke.

At the end of each compression stroke, whether the fresh mixture is admitted in small or large quantity to the power cylinder 11 by any particular adjustment of the port throttle 18, the fresh mixture is effectively fired, since fresh mixture is always present in the restricted clearance space above the auxiliary cylinder, at the end of the compression stroke, and is then in condition for effective firing, and the flame resulting from the firing of the mixture, is projected through the passageway 66 to ignite any fresh mixture that may at the time be in the clearance space 67. Where the charge of fresh fuel mixture is large enough to be in contact with the firing means 70 at the instant of firing, said charge is simultaneously fired by both of said firing means 69 and 70.

Figure 21:
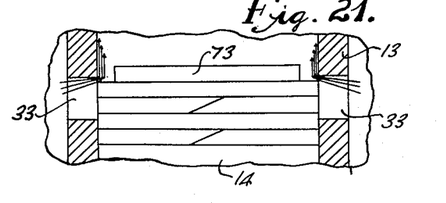
Fig. 21 shows in a view similar to Fig. 1 and to an enlarged scale, the upper end portion of the auxiliary piston 14 shown in Fig. 1, and its relation to the corresponding auxiliary cylinder 13, when said piston has moved downwardly to a position beginning to open the mixture intake ports 33.

As shown in Fig. 1, the auxiliary piston 14 is provided on its upper end, with a deflector 73 similar to the deflector 71, excepting that it extends entirely around the upper end of the auxiliary piston, and as more clearly shown in Fig. 21, this deflector operates in the same manner at the instant of the opening of the intake ports 33, as described above at the instant that the port 17 begins to open, so that the initial effect is to move the spent gases upwardly along the wall of the cylinder 13, and the later action of the gases flowing from all directions inwardly through the ports 33 over the deflector 73, results in a central, upward flow of the mixture in the cylinder 13, tending to completely scavenge the auxiliary cylinder.

Figures 5, 6, 7, 8, 9:
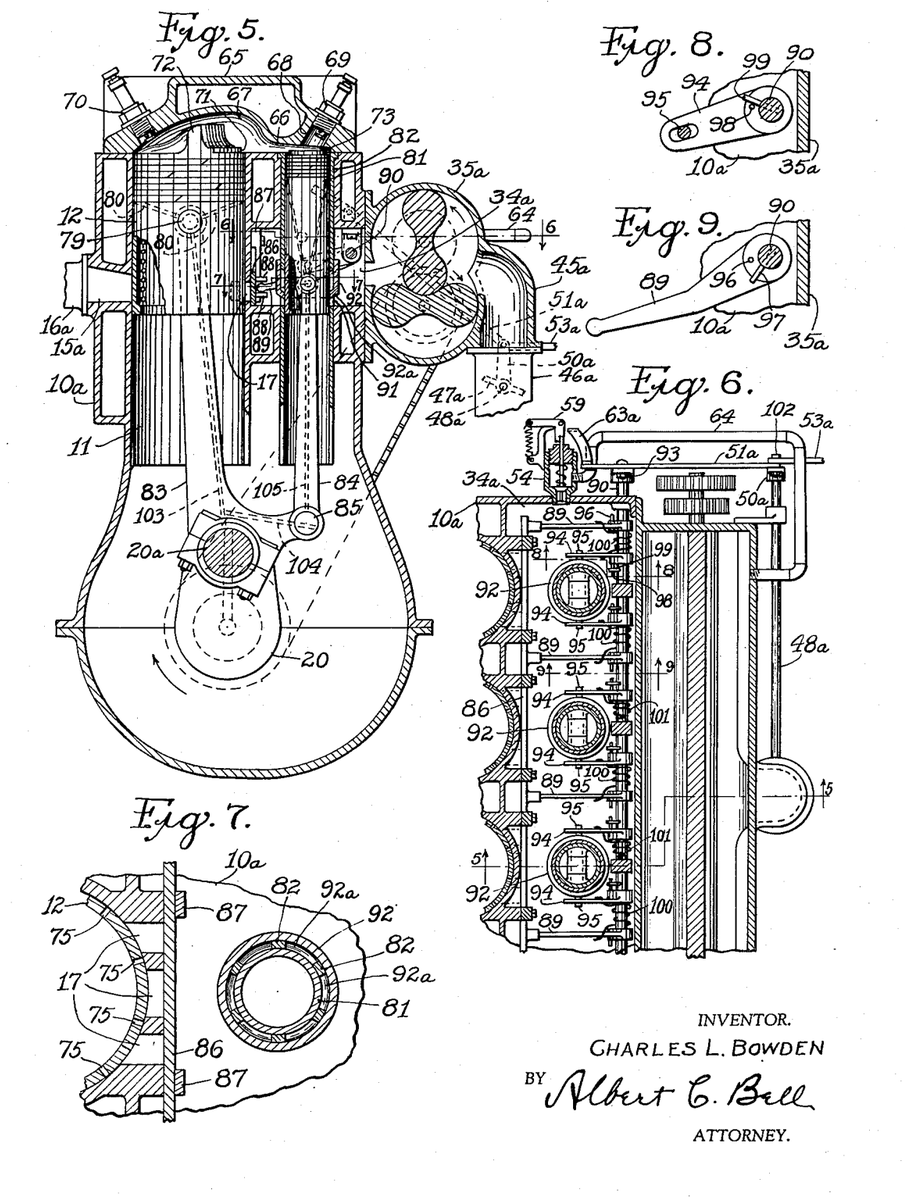
Fig. 5 shows in a view similar to Fig. 1, a modified construction of engine unit in which a single common crank shaft is used for both the power pistons and the auxiliary pistons, this view being taken along the line 5—5 in Fig. 6.
Fig. 6 is a horizontal, sectional view of the construction shown in Fig. 5, taken along the line 6—6 in the latter figure.
Fig. 7 is a horizontal, sectional view to an enlarged scale, of a part of the construction shown in Fig. 5, taken along the line 7—7 in the latter figure.
Fig. 8 is a horizontal, sectional view to an enlarged scale, of a part of the construction shown in Fig. 6, taken along the line 8—8 in the latter figure.
Fig. 9 is a horizontal, sectional view to an enlarged scale, of a part of the construction shown in Fig. 6, taken along the line 9—9 in the latter figure.

As illustrated in Figs. 4 and 7, each of the intake ports 17 consists of a plurality of openings, separated by vertically extending bridges 74, and the piston 12 is provided with vertical rows of small diameter apertures 75 in alignment with said bridges, so that the oil in the crank case 32 may find its way through the apertures 75 and oil the said bridges. In practice, each exhaust port is preferably constructed in parts similarly separated by bridges similarly oiled through other vertical rows of apertures 75 in the cylinder 12.

By my construction, I provide for oiling the pistons as follows. The crank shaft 20 is bored in the usual manner for forced feed lubrication, as indicated at 76 and from this bore, branch bores 77 extend through the working surfaces of the cranks 20a. Each of the connecting rods 19 is provided with a longitudinal bore 78 communicating at intervals with one of the bores 77, the upper end of the bore 78 serving to supply lubricant to and through the piston pin 79, from which pin, bores 80 in the piston 12 which have communication with the interior of the piston pin 79, extend to the groove containing the lowermost one of the piston rings. In this manner, oil under pressure is supplied to the lower piston ring groove, and works around the corresponding piston ring to lubricate the cylinder wall. The crank shaft 26, connecting rod 25, the piston rod 21 and the piston 14 of each auxiliary cylinder 13, are similarly bored to similarly lubricate each auxiliary cylinder.

In Figs. 5 and 6 I illustrate a modified construction of engine, in which the power cylinder 11 and power piston 12 of each engine unit, are the same as above described and similarly associated with an auxiliary piston 81 in an auxiliary cylinder 82. The head 65 in this case is the same as above described and operates in the same manner. The construction of Figs. 5 and 6 differs from the construction of Figs. 1 and 4, in that the pistons 12 and 81 are provided with connecting rods 83 and 84 which are pivotally connected at 85, the connecting rod 83 being also connected with a crank 20a of the crank shaft 20. With this construction, the auxiliary piston 81 has substantially the same stroke as the power piston 12. The ports 17 are controlled as to the amount of their effective opening, by a flat valve plate 86 supported at the supply end of the ports 17 for vertical sliding movement by guide bars 87. The plate 86 is provided at intervals along its length with lugs 88 extending horizontally away from the ports 17, between which lugs the ends of operating levers 89 are disposed, said levers being mounted on an operating shaft 90 supported in the intake manifold as indicated. With this construction, I find it desirable to offset the crank shaft 20 from alignment with the axes of the power cylinders, in the direction of rotation of the crank shaft, which as indicated by the arrow in Fig. 5 is clockwise. This accomplishes two things: first, it affords an increased effective lever arm at each crank for communicating the driving force of a power piston to the crank shaft at the beginning of the firing stroke, and second, it lags the operation of the auxiliary piston 81 somewhat behind the operation of the power piston 12 of each engine unit.

Each of the cylinders 82 consists preferably of a metal tube tightly fitting a corresponding bore in the cylinder block 10a above and below the intake manifold 34a, and extending sufficiently below the block into the crank case, to guide the corresponding auxiliary piston 81 when it is in its lowermost position. Each of the auxiliary cylinders 82 is provided with intake ports 91 of considerable extent vertically, which ports extend entirely around each of said cylinders 82 with vertical bridges separating them, since the intake manifold entirely surrounds the tubes constituting the auxiliary cylinders. A sleeve 92 is mounted in the intake manifold 34a, for vertical sliding movement on each of the auxiliary cylinders 82, which sleeve has at its lower end offset portions 92a extending into the intake ports 91, to complete the inner surface or bore of the auxiliary cylinder and thus limit the effective height of the ports 91 to the distance at any time between the offset portions 92a and the bottom of the ports 91, which is somewhat below the bottom of the main intake ports 17.

The intake manifold 34a opens through the side wall of the cylinder block 10a, and is closed by the casing of a pumping mechanism 35a similar to the pumping mechanism 35 above described, and similarly provided with an intake passageway 45a and carbureting devices 46a having a throttle valve 47a. The throttle valve 47a is mounted on a control shaft 48a, which as more clearly shown in Fig. 6, is extended to and beyond the end of the cylinder block 10a, where it carries a crank 50a connected by a link 51a with a crank 93 secured to the end of the shaft 90, where the latter extends beyond the end of the cylinder block 10a. The intake manifold 34a is provided with a pressure relief valve 54 and by-pass pipe 64 constructed and operating as described above in connection with Figs. 1 and 4, and the valve retaining member 59 is in line with a bent arm 63a carried by the link 51a, to move the member 59 to release the valve member of the pressure relief valve, when the throttle valve 47a is closed or nearly so. A rod 53a is connected with the link 51a and the crank 50a, and extends to a position convenient for operation by the operator of the engine.

As more clearly shown in Fig. 6, the shaft 90, in addition to the levers 89, carries pairs of levers 94, there being one pair of said levers 94 for each of the sleeves 92. Each of the sleeves 92 is provided with horizontal pins 95, each extending as more clearly shown in Fig. 8, through a corresponding one of the levers 94. The levers 89 and 94 are free to turn angularly to a limited amount, on the shaft 90. Each of the levers 89 is provided at its hub portion, with a pin 96 extending parallel with the shaft 90 for engagement by a pin 97 extending radially from the shaft 90, as more clearly shown in Fig. 9, so that for rotation of the shaft 90 in a counterclockwise direction as seen in Fig. 9, the lever 89 may move angularly with the shaft until the plate 86 is in its lowermost position, after which the shaft 90 may continue turning in the same direction. Each of the levers 94 is provided at its hub portion, with a pin 98 extending parallel with the shaft, for engagement by a pin 99 extending radially from the shaft as more clearly shown in Fig. 8. The shaft 90 carries springs 100 and 101 engaging the levers 89 and 94 as indicated in Fig. 6, so that said springs tend to hold the levers 89 in their lowermost position, and to hold the levers 94 in their uppermost position. As a result of this construction, when the shaft 90 is in a position holding the plate 86 in its uppermost position, the action of the springs last mentioned, holds the sleeves 92 in their uppermost position; then, when the shaft 90 is turned in a counter-clockwise direction as seen in Figs. 8 and 9, the levers 89 are moved downwardly by the action of said springs, holding the pins 96 and 97 in engagement with each other, and the pins 98 and 99 positively move the levers 94 downwardly, thus moving the sleeves 92 downwardly, which action continues until the plate 86 reaches its lowermost position, completely closing the main intake ports 17; at the time of the closing of the main intake ports, the sleeves 92 are still above the bottoms of the auxiliary intake ports 91, leaving a sufficient opening of the ports 91 to take care of the running of the engine under reduced fuel charges; further rotation of the shaft 90 in the same direction as last described, further moves the sleeves 92 downwardly, which movement may be continued, if desired, until the auxiliary intake ports 91 are nearly or quite closed, for which condition the pins 96 and 97 will have a relation to each other generally indicated in Fig. 9. The connection of the rod 53a and the link 51a to the lever 50a is by means of a bolt or screw 102, and if preferred, by disconnecting the said bolt or screw from the lever 50a, the operation of the engine may be controlled by the plate 86 and the sleeves 92, in which case the plate and sleeves will serve as the main throttle valve of the engine, assuming the throttle valve 47a to be in its open position.

The construction of the sleeves 92 and their operation with the throttle valve 47a as above described, afford a means for closing the intake ports 91 later than the closing of the exhaust port 15 when the engine is running under load and with relatively large fuel charges, at which time the fluid pressure in the intake manifold 34a may be a desired amount greater than atmospheric pressure, and afford also a means for closing the intake ports 91 at the same time as the closing of the exhaust port 15 when the engine is running on light load or with no load.

The connecting rods 83 and 84 are preferably provided with oil passageways 103, 104 and 105 for supplying lubricating oil under pressure to and through the pistons 12 and 81 in the manner above described for the construction shown in Fig. 1.

Figures 10, 12, 13:
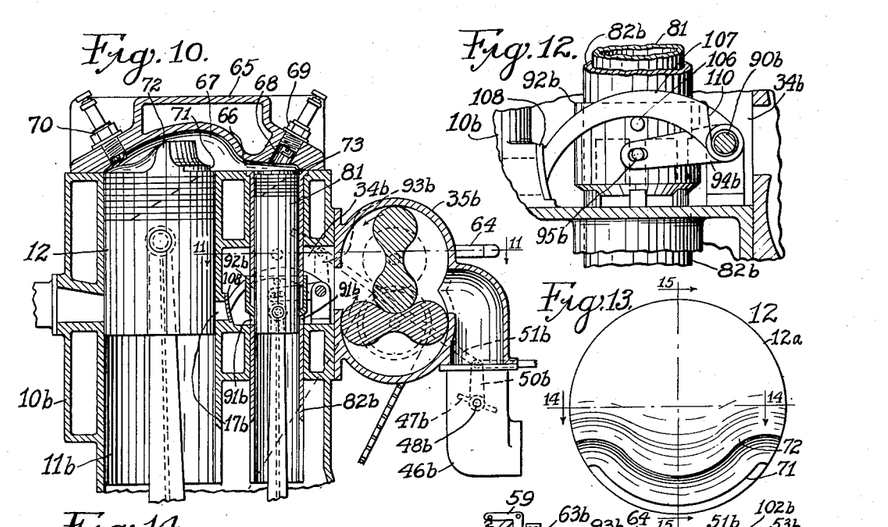
Fig. 10 shows in a view similar to Figs. 1 and 5, a construction of engine unit similar to that illustrated in said figures, and shows a modified form of means for controlling the intake ports to the main cylinders, this view being taken along the line 10—10 in Fig. 11.
Fig. 12 is a horizontal, sectional view to an enlarged scale, of a part of the construction shown in Fig. 11, taken along the line 12—12.
Fig. 13 is a plan view of the power piston illustrated in Figs. 1, 5 and 10, to show the form of deflector construction employed.
Figure 11:
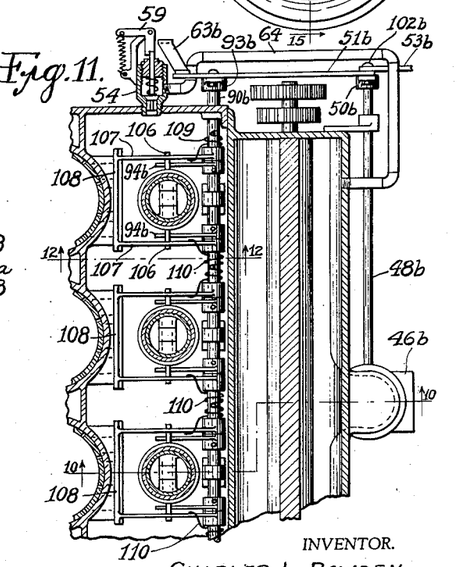
Fig. 11 is a horizontal, sectional view of the construction shown in Fig. 10, taken along the line 11—11.

The modified construction illustrated in Figs. 10, 11 and 12 is similar to that described in connection with Figs. 5 and 6, the differences being the form of the port throttle valves associated with the main intake ports, and the means employed to operate said port throttle valves and the sleeves controlling the effective size of opening of the auxiliary intake ports. In this construction, the cylinder block 10b is of substantially the construction illustrated for the cylinder block 10a in Fig. 5, and contains power cylinders 11b and auxiliary cylinders 82b similar to the corresponding main and auxiliary cylinders in Fig. 5, said cylinders being provided with pistons 12 and 81 as described in connection with Fig. 5. Each of the cylinders 82b is provided with intake ports 91b controlled as to size by a sleeve 92b, each of said sleeves, as more clearly shown in Fig. 12, having pins 95b extending therefrom for engagement with levers 94b rigidly secured to an operating shaft 90b. extending through the intake manifold 34b. Each of the sleeves 92b is provided with second oppositely extending pins 106, substantially parallel with the pins 95b, which pins 106 extend under levers 107 supported on the shaft 90b for limited turning movement thereon. The levers 107 at their other ends, are rigidly secured in pairs to the end portions of curved plates 108 constituting the main port throttles of the engine, there being one of these curved plates for each of the power cylinders. The outer curved surfaces of the plates 108 fit correspondingly curved surfaces of the cylinder block 10b at the inner ends of the intake ports 17b of said block, which curved surfaces are cylindrical surfaces described about the axis of the shaft 90b. As more clearly shown in Fig. 11, the shaft 90b carries springs 109 and 110, which engage the levers 107 and tend to hold them in engagement with the pins 106. As a result of this construction, when the shaft 90b is turned in a clockwise direction as seen in Fig. 12, to its extreme position, the levers 94b are correspondingly operated, and the sleeves 92b are raised to their uppermost position, which through the pins 106, raises the levers 107 and the port throttle plates 108 to their uppermost position, thus completely opening the main intake ports 17b, and giving the auxiliary intake ports 91b their maximum opening; when the shaft 90b is rotated in a counterclockwise direction from the position last described, the sleeves 92b are correspondingly moved downwardly and through the action of the springs 109 and 110, the throttle plates 108 are given corresponding downward movement until the throttle plates 108 reach their lowermost position completely closing the main intake ports 17b, at which time the sleeves 92b are still somewhat above their lowermost position, leaving the auxiliary intake ports 91b sufficiently open to take care of running the engine under light load or no load; continued movement in a counter-clockwise direction of the shaft 90b further reduces the effective size of the auxiliary intake ports until they are nearly or quite closed as desired, the springs 109 and 110 permitting this movement of the sleeves 92b, without movement of the port throttle plates 108.

The pumping mechanism 35b employed in the construction shown in Fig. 10 is the same as that shown in connection with Figs. 5 and 6, and the intake manifold 34b is provided with a pressure relief valve 54 and by-pass pipe 64 in the same manner and for the same purpose as described for Figs. 1, 4, 5 and 6. As shown in Fig. 11, the shaft 48b supporting and carrying the throttle valve 47b of the carbureting mechanism 46b, carries at its end a lever 50b connected by a link 51b with a crank 93b carried by the end of the shaft 90b. The link 51b carries a bent arm 63b for operating the member 59 of the pressure relief valve 54, as and for the purposes above described. The link 51b is connected with an operating rod 53b and with the lever 50b, by a bolt or screw 102b and by disconnecting the bolt or screw from the lever 50b, the operation of the engine may be entirely controlled by turning the shaft 90b, assuming the throttle valve of the mechanism to be in its open position.

Figure 14:
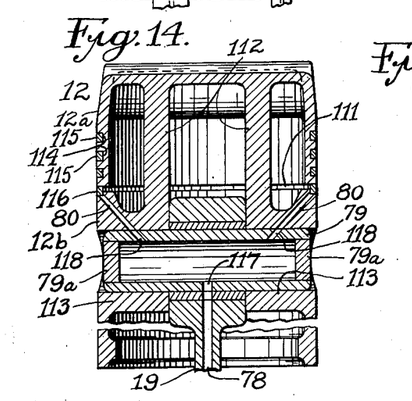
Fig. 14 is a vertical, sectional view of the construction shown in Fig. 13, taken along the line 14—14.
Figure 15:
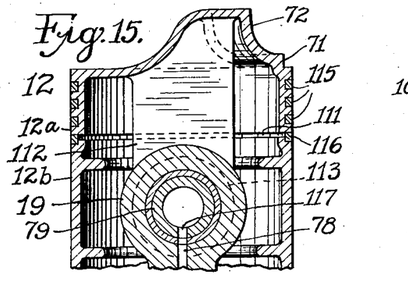
Fig. 15 is a vertical, sectional view of the construction shown in Fig. 13, taken along the line 15—15.

The piston 12 is preferably of the construction illustrated in Figs. 13, 14 and 15, the construction of the two deflectors 71 and 72 being clearly illustrated in Figs. 13 and 15. In this construction, the piston is preferably made in two parts 12a and 12b constituting the head and skirt parts of the piston, separated from each other by a small clearance space 111. The two parts of the piston are connected by internal and integral struts 112 extending from the head of the part 12a, to the bosses 113 provided on the part 12b to receive the piston pin 79. The part 12a is provided with grooves 114 to receive the piston rings 115, and the upper end of the part 12b is recessed to form a seat for the lowermost piston ring 116 which serves to close the clearance space 111 at the outer surface of the piston. The separation of the piston into two parts, permits considerable expansion of the head portion of the piston, without correspondingly expanding the skirt portion of the piston, and the fit between the skirt portion and the cylinder may thus be more accurately maintained than if the piston were in a single part. As shown in Fig. 14, the passageway 78 in the connecting rod 19, communicates with an aperture 117 through the wall of the piston pin 79, the ends of the piston pin being closed by plugs 79a. The piston pin has other apertures 118 through it, for communication with the passageways 80 leading to the groove containing the lowermost piston ring 116. Lubricating oil under pressure may thus be forced into and through the piston pin 79, and into the groove containing the ring 116, from which groove the oil works around the piston ring and to the outer surface of the piston, to lubricate the corresponding cylinder. The deflectors 71 and 72 are illustrative of any equivalent deflector construction in which one part of said construction is effective during the opening of the corresponding intake ports, to direct the incoming gases in a first path or paths and begin the scavenging of the cylinder by gas flow through one part of the cylinder, and in which another part of said construction is later effective in directing the incoming gases in a second path or paths to further scavenge the cylinder by gas flow through another part thereof, the combined effect of the two actions being to effectively scavenge the entire cylinder. I do not therefore limit myself to the particular deflector construction shown and described.

Figure 16:
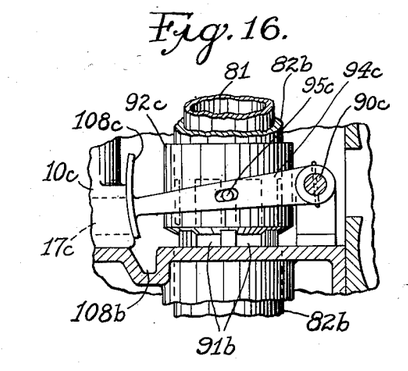
Fig. 16 shows in a view similar to Fig. 12, a modified form of device for operating the means controlling the intake ports of the power cylinders.

In Fig. 16, I illustrate a modification of the port throttle construction shown in Figs. 10, 11 and 12, the engine being the same in other respects. As shown in Fig. 16, each of the levers 94b is replaced by a lever 94c engaging one of the pins 95b extending from the sleeve 92b, the levers 94c being rigidly secured to the shaft 90b. The sleeves 92b are thus operated as described in connection with Figs. 10 to 12 inclusive, by turning the shaft 90b. As shown in Fig. 16, each lever 94c is extended beyond the pin 95b engaged by it, and is rigidly secured at its outer end to a port throttle plate 108c of the same construction as the port throttle plate 108 above described, excepting that it is of greater extent vertically, than the plate 108. The cylinder block 10c is provided below the main intake port 17c, with a recess 108b to receive the lower edge portion of each of the plates 108c, when said plate is in its lowermost position corresponding to the lowermost position of the sleeve 92b closing the auxiliary intake ports 91b. The upwardly extended portion of each of the plates 108c keeps the corresponding main intake port 17c closed, for adjustments of the corresponding sleeve 92b for running the engine under light load and under no load.

Figures 17, 19, 20:
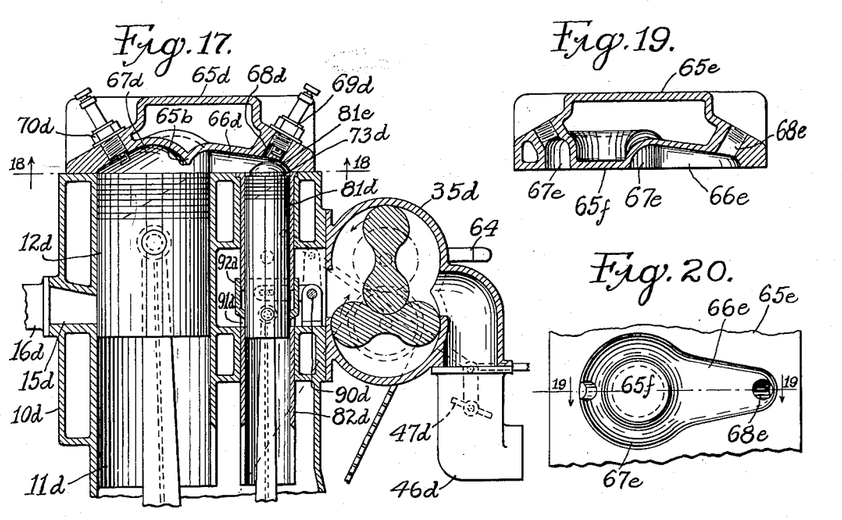
Fig. 17 illustrates in a view similar to Figs. 1, 5 and 10, a modified construction by which the power cylinders are not provided with intake ports, the entire supply of fuel mixture being through the auxiliary cylinders, the construction in other respects being similar to that shown in Figs. 10 and 11, excepting that the cylinder head is provided with communicating passages permitting free flow of the relatively larger fuel charges flowing through the auxiliary cylinders under load.
Fig. 19 shows in a view similar to Fig. 17, a modified form of head construction for use with the engine construction illustrated in Fig. 17, this view being taken along the line 19—19 in Fig. 20.
Fig. 20 is a bottom view of the head construction illustrated in Fig. 19.

In Fig. 17 I illustrate a modified engine construction, by which the power cylinders are not provided with intake ports, the fresh fuel mixture for all running conditions of the engine being supplied to the power cylinder 11d and to the auxiliary cylinder 82d of each engine unit, through intake ports 91d in the auxiliary cylinder corresponding to the auxiliary intake ports 91 and 91b above described.

Figure 18:
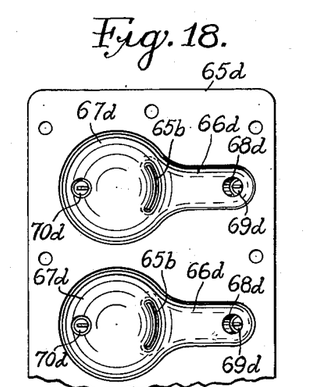
Fig. 18 is a horizontal, sectional view of the construction shown in Fig. 17, taken along the line 18—18.

With this construction, the passageway 66d in the head 65d, connecting the cylinders 11d and 82d, is preferably of larger cross-section than the passageway 66 above described, to transfer full-load fuel charges from the cylinder 82d to the cylinder 11d with a minimum of retardation, and the head end of the auxiliary piston 81d in the auxiliary cylinder 82d, is provided with an upwardly extending dome 81e which extends into the passageway 66d, closely adjacent to the upper surface of the passageway 66d and to the inner end of the pocket 68d in the head 65d, for the head position of the piston 81d, said pocket containing firing means 69d, the restricted clearance space thus produced above the piston 81d, operating for reduced fuel charges, to maintain fresh fuel mixture in contact with the firing means 69d by each compression stroke of the auxiliary piston 81d, in substantially the manner above described and effectively firing the fuel mixture, for all fuel charges and engine running conditions. The piston 81d is provided with a small deflector 73d similar to the deflector 73 above described and for the same purpose. The power piston 12d is not provided with a deflector construction, since the cylinder 11d has no intake ports, and to thoroughly scavenge the cylinder 11d, the head 65d is provided with a downwardly extending deflector 65d above each cylinder 11d, which as more clearly shown in Fig. 18, extends laterally across the larger part of the discharge end of the passageway 66d, with a substantial clearance space around each of its ends into the compression space 67d above the corresponding cylinder 11d. As a result, a part of each fuel charge, particularly when the engine is running under load, is directed downwardly by the deflector 65b, along the vertical wall of the cylinder 11d which is opposite to the exhaust port 15d, other parts of the same fuel charge passing around the ends of the deflector 65b and into the compression space 67d, completely filling said compression space and moving downwardly in the cylinder 11d, and serving to effectively move the spent gases through the exhaust port 15d into the exhaust manifold 16d. The compression space 67d is provided with firing means, for example, a spark plug 70d, substantially as and for the same purpose as above described for the firing means 70.

With this construction, the effective size of the intake ports 91d of each engine unit, is controlled by a sleeve 92d similar to the sleeves 92 and 92b above described, and similarly operated by a shaft 90d, connected with the throttle valve 41d of the carbureter 46d supplying the pumping mechanism 35d with fuel mixture, in substantially the manner and with the results above described in connection with the shafts 90 and 90b and throttle valves 41a and 41b. It will be noted that, in the manner above described, the sleeves 92d may be used as the main throttle valve of the engine, if desired.

It will be understood that the dome 81e may have any shape desired, the only requisite being that it shall have generally the same form as the upper surface of the passageway 66d above it, and that for the head position of the auxiliary piston 81d, said dome shall be so close to the upper surface of said passageway, as to positively move the smallest charge of fresh fuel mixture for which the engine will operate at all with no load, into contact with the firing means 69d, and hold the compressed charge in that position until it is fired by said firing means.

With the construction illustrated in Fig. 17, either type of crank shaft construction above described, may be employed as desired.

In Figs. 19 and 20, I illustrate a form of cylinder head 65e, which I find is effective in preventing detonation. The head 65e is illustrated as applicable to the engine construction shown in Fig. 17, and is provided for each engine unit, with a passageway 66e and a fuel mixture pocket 68e for the purpose above described for the passageways 66 and 66d and the pockets 68 and 68d. With this construction, the compression space 67e for each engine unit, is annular and of an outer diameter substantially equal to the diameter of the bore of the corresponding power cylinder, which compression space in the construction illustrated, communicates at one side with the corresponding passageway 66e. The inner surface 65f of the head 65e surrounded by the compression space 67e, is of the same shape as and is closely adjacent to the head end of the corresponding power piston, when the latter is in its head position, the separation of the surface 65f from the head end of the piston for that condition, being as small as possible without having the piston hit the head. The diameter of the surface 65f is substantially equal to the inner diameter of the compression space 67e, the inner and outer vertical surfaces of said space 67e being preferably cylindrical and joined at the top of said space by a curved wall extending radially from one of said cylindrical surfaces to the other. This construction closely covers the central portion of each power piston when the fuel mixture is under maximum compression and fired, and prevents the firing of the mixture by the highly heated central portion of the head of the piston, the said portion of the piston being the hottest surface in the firing chamber, and frequently becoming so hot under load, as to effect secondary firing or detonation of the fuel mixture, when the compression pressure is increased by the firing of the fuel mixture by the firing means employed for that purpose. By means of my improved construction just described, which also operates as a deflector and which is applicable to power cylinders generally, whether the piston heads be flat or not, the compressed fuel mixture is prevented from becoming highly heated by the highly heated central portion of the power piston by the cooling effect of the head, and detonation is prevented. While I illustrate the head end of the power piston as flat, it will be understood that any other preferred shape may be employed, the only requisite being that the surface of the cylinder head within the corresponding compression space, shall fit the head end of the corresponding power piston as closely as mechanical considerations will permit, when the piston is at the head end of each compression stroke.

While I have shown my invention in the particular embodiment above described, it will be understood that I do not limit myself to this exact construction as I may employ equivalents known to the art at the time of the filing of this application without departing from the scope of the appended claims.

What I claim is:

1. In a two cycle engine, the combination of a plurality of power cylinders, an auxiliary cylinder associated with and in open communication at its head end with each of said power cylinders, a power piston in each of said power cylinders, and an auxiliary piston in each of said auxiliary cylinders, said power cylinders having ports opened by the corresponding power pistons, each of said auxiliary cylinders having an intake port opened and closed by the corresponding auxiliary piston, each of said auxiliary pistons comprising a cylindrical member having an annular groove at its head end opening radially through its cylindrical surface and axially through its head end, said groove having a cylindrical wall spaced from the wall of the corresponding auxiliary cylinder and constituting a deflector, the axial extent of said groove being substantially less than the height of the corresponding intake port.

2. In a two cycle engine, the combination of a plurality of power cylinders, an auxiliary cylinder associated with and in open communication at its head end with each of said power cylinders, a power piston in each of said power cylinders, an auxiliary piston in each of said auxiliary cylinders, said power cylinders having ports opened by the corresponding power pistons, each of said auxiliary cylinders having an intake port opened and closed by the corresponding auxiliary piston, a head closing said cylinders and having a passageway affording said open communication between each of said power cylinders and the auxiliary cylinder associated therewith, and mixture firing means in each of said passageways, said head having a clearance space over each of said power pistons substantially greater relatively to the piston diameters than the clearance space over the corresponding auxiliary piston.

3. In a two cycle engine, the combination of a plurality of power cylinders, an auxiliary cylinder associated with and in open communication at its head end with each of said power cylinders, a power piston in each of said power cylinders, an auxiliary piston in each of said auxiliary cylinders, said power cylinders having ports opened by the corresponding power pistons, each of said auxiliary cylinders having an intake port opened and closed by the corresponding auxiliary piston, and a member movable to change as desired the time of closing of each of said intake ports relatively to the time of closing of the corresponding exhaust port.

4. In a two cycle engine, the combination of a plurality of power cylinders, an auxiliary cylinder associated with and in open communication at its head end with each of said power cylinders, a power piston in each of said power cylinders, an auxiliary piston in each of said auxiliary cylinders, said power cylinders having ports opened by the corresponding power pistons, each of said auxiliary cylinders having an intake port opened and closed by the corresponding auxiliary piston, a member movable to change as desired the time of closing of each of said intake ports relatively to the time of closing of the corresponding exhaust port, a throttle valve controlling the supply of fuel mixture to the engine, and devices connecting said members with said throttle valve for simultaneous operation.

5. In a two cycle engine, the combination of a power cylinder, an auxiliary cylinder, a piston in each of said cylinders, said power cylinder having an exhaust port controlled by the piston therein, said auxiliary cylinder having an intake port controlled by the piston therein, a passageway affording open communication between said cylinders, and firing means in said passageway over said auxiliary cylinder, the compression clearance space for said auxiliary cylinder being relatively less than the compression clearance space for said power cylinder and of a size to be filled with fresh mixture on compression of the smallest charge of fresh mixture in the auxiliary cylinder on which the engine will run on no load.

6. In a two cycle engine, the combination of a power cylinder, an auxiliary cylinder, a piston in each of said cylinders, said power cylinder having an exhaust port controlled by the piston therein, said auxiliary cylinder having an intake port controlled by the piston therein, a passageway affording open communication between said cylinders, firing means in said passageway over said auxiliary cylinder, and a member movable at will to change the time of closing of said intake port relatively to the time of closing of said exhaust port.

7. In a two cycle engine, the combination of a power cylinder, an auxiliary cylinder, a piston in each of said cylinders, said power cylinder having an exhaust port controlled by the piston therein, said auxiliary cylinder having an intake port controlled by the piston therein, a passageway affording open communication between said cylinders, and firing means in said passageway over said auxiliary cylinder, said intake port constituting the sole supply passageway for fresh fuel mixture for both of said cylinders, the clearance space over said power piston being substantially greater relatively to the piston diameters than the clearance space over said auxiliary piston.

8. In a two cycle engine, the combination of a power cylinder, an auxiliary cylinder, a piston in each of said cylinders, said power cylinder having an exhaust port controlled by the piston therein, said auxiliary cylinder having an intake port controlled by the piston therein, a passageway affording open communication between said cylinders, firing means in said passageway over said auxiliary cylinder, said intake port constituting the sole supply passageway for fresh fuel mixture for both of said cylinders, and a head enclosing the ends of said cylinders and said passageway, said head having a deflector extending therefrom towards said power cylinder, the clearance space over said power piston being substantially greater relatively to the piston diameters than the clearance space over said auxiliary piston.

9. In a two cycle engine, the combination of a power cylinder, an auxiliary cylinder, a piston in each of said cylinders, said power cylinder having an exhaust port controlled by the piston therein, said auxiliary cylinder having an intake port controlled by the piston therein, a passageway affording open communication between said cylinders, firing means in said passageway over said auxiliary cylinder, and a head enclosing the ends of said cylinders and said passageway, said head having a deflector extending therefrom towards said power cylinder, said deflector being circular and of smaller diameter than the bore of said power cylinder and having a lower face of the same form as and closely adjacent the central portion of the corresponding piston in its uppermost position, said head having an annular recess around said deflector constituting a compression clearance space over said power cylinder, the clearance space over said power piston being substantially greater relatively to the piston diameters than the clearance space over said auxiliary piston.

10. In a two cycle engine, the combination of a power cylinder, an auxiliary cylinder, a piston in each of said cylinders, said power cylinder having an exhaust port and an intake port controlled by the piston therein, said auxiliary cylinder having an intake port controlled by the piston therein, a passageway affording open communication between said cylinders, and firing means in said passageway over said auxiliary cylinder, a first member movable to open and close said main cylinder intake port, a second member movable to change the effective size of said auxiliary cylinder intake port, and mechanism connected with said members to operate said members, said second member in its port closing effect lagging behind said first member, whereby movement of said mechanism in a first direction moves said first member to its port closing position before said second member reaches its port closing position, continued movement of said mechanism in said first direction further moves said second member towards its port closing position as desired and maintains said first member in its port closing position, movement of said mechanism in a second direction first moves said second member as desired to partly open its port and maintains said first member in its port closing position, and continued movement of said mechanism in said second direction moves both of said members to their port opening positions.

11. In a two cycle engine, the combination of a power cylinder, an auxiliary cylinder associated with and in open communication at its head end with said power cylinder, a power piston in said power cylinder, and an auxiliary piston in said auxiliary cylinder, said power cylinder having a port opened by the power piston, said auxiliary cylinder having an intake port opened and closed by the auxiliary piston, said auxiliary piston comprising a cylindrical member having an annular groove at its head end opening radially through its cylindrical surface and axially through its head end, said groove having a cylindrical wall spaced from the wall of the auxiliary cylinder and constituting a deflector, the axial extent of said groove being substantially less than the height of said intake port.

CHARLES L. BOWDEN.